US012203407B2

(12) United States Patent
Ballou

(10) Patent No.: US 12,203,407 B2
(45) Date of Patent: Jan. 21, 2025

(54) SOUND MODIFICATION APPARATUS FOR A TURBOCHARGED ENGINE

(71) Applicant: FORD GLOBAL TECHNOLOGIES, LLC, Dearborn, MI (US)

(72) Inventor: Derek Ballou, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 272 days.

(21) Appl. No.: 17/732,397

(22) Filed: Apr. 28, 2022

(65) Prior Publication Data

US 2023/0349317 A1 Nov. 2, 2023

(51) Int. Cl.

| | |
|---|---|
| ***G10K 15/04*** | (2006.01) |
| ***F02B 37/12*** | (2006.01) |
| ***F02M 35/12*** | (2006.01) |
| ***G10K 9/04*** | (2006.01) |

(52) U.S. Cl.

CPC ................ *F02B 37/12* (2013.01); *G10K 9/04* (2013.01); *G10K 15/04* (2013.01); *F02M 35/12* (2013.01)

(58) Field of Classification Search

CPC .......... F02B 37/12; G10K 15/04; G10K 9/02; G10K 9/04; G10K 5/02; F02M 35/12; F02M 35/10157; F02M 35/1216; F02M 35/1294; F04D 27/0215; F01N 1/026; F01N 1/082; F01N 1/088

USPC ...... 181/175, 179, 192, 177; D15/5; 116/24, 116/138, 139, 140

See application file for complete search history.

(56) References Cited

U.S. PATENT DOCUMENTS

| | | | | |
|---|---|---|---|---|
| 4,792,014 A * | 12/1988 | Shin-Seng | ............ | F01N 13/082 181/227 |
| 6,722,128 B1 * | 4/2004 | Adrian | .................... | F02B 37/16 60/601 |
| 7,322,194 B2 | 1/2008 | Sun et al. | | |
| 2009/0077968 A1 | 3/2009 | Sun | | |

FOREIGN PATENT DOCUMENTS

| | | | |
|---|---|---|---|
| JP | 3911512 | 5/2007 | |
| WO | WO-2017155422 A1 * | 9/2017 | ............... F01N 1/00 |

OTHER PUBLICATIONS

Youtube Video Screenshot: https://youtu.be/kF7ix_ZxcCM; 2013 Taurus SHO BOV blow-off valve mod, Dated: Dec. 2, 2015.
Screenshot: GFB Go Fast Bits, throtl.com, Dated: Dec. 8, 2021, 3 pgs.

* cited by examiner

*Primary Examiner* — Forrest M Phillips
*Assistant Examiner* — Jennifer B. Olson
(74) *Attorney, Agent, or Firm* — Vincent Mastrogiacomo; Brooks Kushman P.C.

(57) ABSTRACT

An apparatus, a system, and a method are disclosed for enhancing a sound of an engine having a turbocharger. The apparatus is used with a vehicle having a turbocharger that includes a recirculation hose that is disconnected from the system. A short section of hose is assembled to a blow-off valve and a sound modification apparatus that includes a horn end and an attachment portion. The attachment portion is connected to an outlet end of the short section of hose. The horn end has a conical end through which a first tone is emitted when vented gases pass inside the horn and a plurality of arcuate opening through which a second tone is emitted.

18 Claims, 3 Drawing Sheets

SOUND MODIFICATION APPARATUS FOR A TURBOCHARGED ENGINE

TECHNICAL FIELD

This disclosure relates to aftermarket sound modification apparatus for turbocharged engines having recirculation blow-off valves.

BACKGROUND

Current turbocharged engines may be equipped with an electronic blow-off valve that recirculates pressurized air into the vehicles air intake through a recirculation hose in a relatively quiet manner. Car performance enthusiasts may prefer to hear a satisfying *WHOOSH* sound when they let off the accelerator after a launch or a pull. A current aftermarket modification is to remove the hose that carries the pressurized air from the blow-off valve back to the air intake, capping the port on the air intake, and allowing the blow-off valve to vent through the open port on the blow-off valve to the atmosphere. Simply venting the pressurized air from the blow-off valve through the port on the blow-off valve into the atmosphere provides an audible sound for turbo car enthusiasts to enjoy, but is still comparably quiet and lackluster compared to the sound produced by the traditional pressure driven, external blow-off valve included on traditional after-market turbocharger systems.

This disclosure is directed to solving the above problems and other problems as summarized below.

SUMMARY

According to one aspect of this disclosure, a sound modification apparatus is provided for a turbocharged engine. The sound modification apparatus comprises:

- a hose attachment portion adapted to be connected to a short section of hose that is connected to the recirculation port of the blow-off valve that functions to vent the gases through the sound modification apparatus;
- a central horn having a bell-shaped end through which a first tone is emitted when the vented gases pass inside the central horn; and
- a plurality of arcuate openings defined by the hose attachment portion through which the vented gases pass and are directed toward an outer surface of the central horn, wherein a second tone is emitted when the vented gases pass through the arcuate openings.

Another aspect of the sound modification apparatus is that the bell-shaped end of the central horn may have an inner surface that flares outwardly from a central axis in an arcuate path from the hose attachment portion to a distal end.

The plurality of arcuate openings may include four arcuate openings spaced about the central horn.

The hose attachment portion may be a cylindrical tube and includes four ribs on an inner surface of the tube that extend longitudinally through the tube. The four ribs may extend beyond the hose attachment portion to the outer surface of the central horn. The four ribs may each be disposed between two of the arcuate openings. The four ribs may connect the hose attachment portion to the central horn.

According to another aspect of this disclosure, a system is disclosed for enhancing a sound of an engine having a turbocharger, The system includes a blow-off valve that normally ports recirculated gases through a recirculation hose to an air intake. The recirculation hose is removed and a short section of hose is assembled to a recirculation port of the blow-off valve and to a sound modification apparatus. The sound modification apparatus is connected to an outlet end of the short section of hose on a hose attachment portion. The sound modification apparatus features a horn having a conical end through which a first tone is emitted when gases are vented from the recirculation port to pass inside the horn.

According to other potential aspects of the system, a plurality of arcuate openings may be defined by the hose attachment portion through which vented gases pass that are directed toward an outer surface of the horn, wherein a second tone is emitted when the vented gases pass outside the horn. The plurality of arcuate openings may include four arcuate openings spaced about the horn.

The hose attachment portion of the system may be a cylindrical tube that includes four ribs on an inner surface of the tube that extend longitudinally through the tube. The four ribs may extend beyond the hose attachment portion to the outer surface of the horn. The four ribs may each be disposed between two of the arcuate openings. The four ribs may connect the hose attachment portion to the horn.

According to yet another aspect of this disclosure, a method is disclosed for enhancing the sound of an engine having a turbocharger and a blow-off valve. The blow-off valve receives gases from a charge pipe. The method comprises the steps of disconnecting the recirculation hose from a port of the blow-off valve and the air intake, and plugging the port in the air intake with a cap. Attaching a short section of hose to the port in the blow-off valve and a sound modification apparatus. The sound modification apparatus includes a hose attachment portion adapted to be connected to the short section of hose that receives vented gases and a horn having a conical end through which a first tone is emitted when a first portion of the vented gases pass inside the horn. A plurality of arcuate openings are defined by the hose sound modification apparatus through which a second portion of the vented gases pass that are directed toward an outer surface of the horn. The arcuate openings emit a second tone that differs from the first tone when the second portion of vented gases pass outside the horn.

According to further aspects of the method, the hose attachment portion may be a cylindrical tube that includes four ribs on an inner surface of the tube that extend longitudinally through the tube. The four ribs may extend beyond the hose attachment portion to the outer surface of the horn. The four ribs may each be disposed between two of the arcuate openings. The four ribs may connect the hose attachment portion to the horn. The horn may have a central axis, and the conical end may have an inner surface that flares outwardly in an arcuate path from the hose attachment portion to a distal end.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Various features illustrated and described with reference to any one of the figures may be combined with features illustrated in one or more of the other figures to produce embodiments that are not explicitly illustrated or described. The combinations of features illustrated provide representative embodiments for typical applications. Various combinations and modifications of the features consistent with the teachings of this disclosure could be used in particular applications or implementations.

Figure 1:
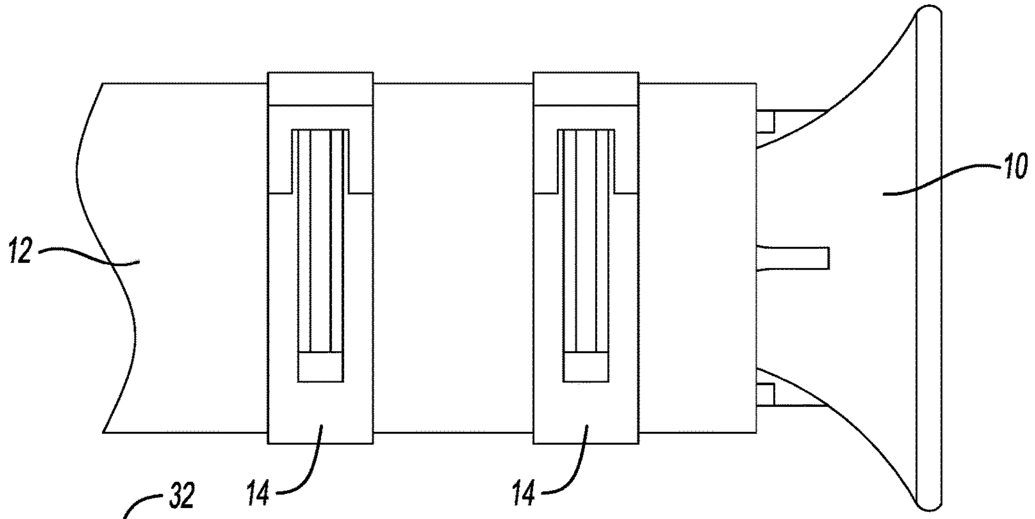
FIG. 1 is a fragmentary elevation view of a sound modification apparatus attached to a recirculation hose with hose clamps.

Referring to FIG. 1, of a sound modification apparatus 10 is attached to a short section of hose 12 with a pair of hose clamps 14.

Figure 2:
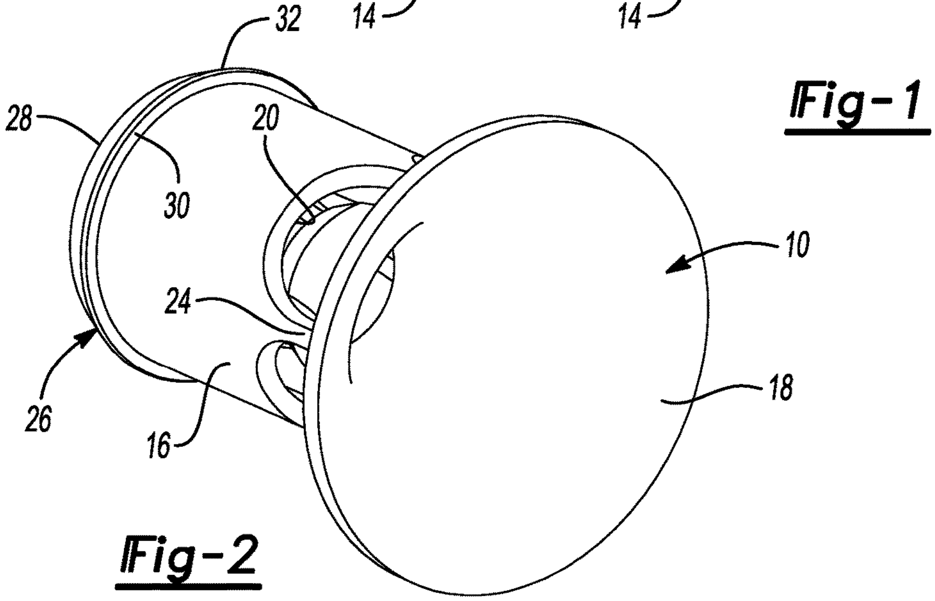
FIG. 2 is a perspective view of the sound modification apparatus
Figure 3:
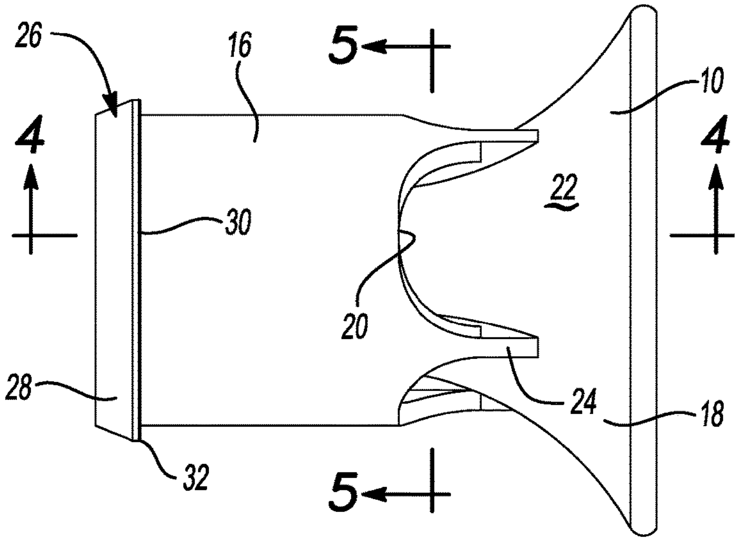
FIG. 3 is an elevation view of a sound modification apparatus
Figure 7:
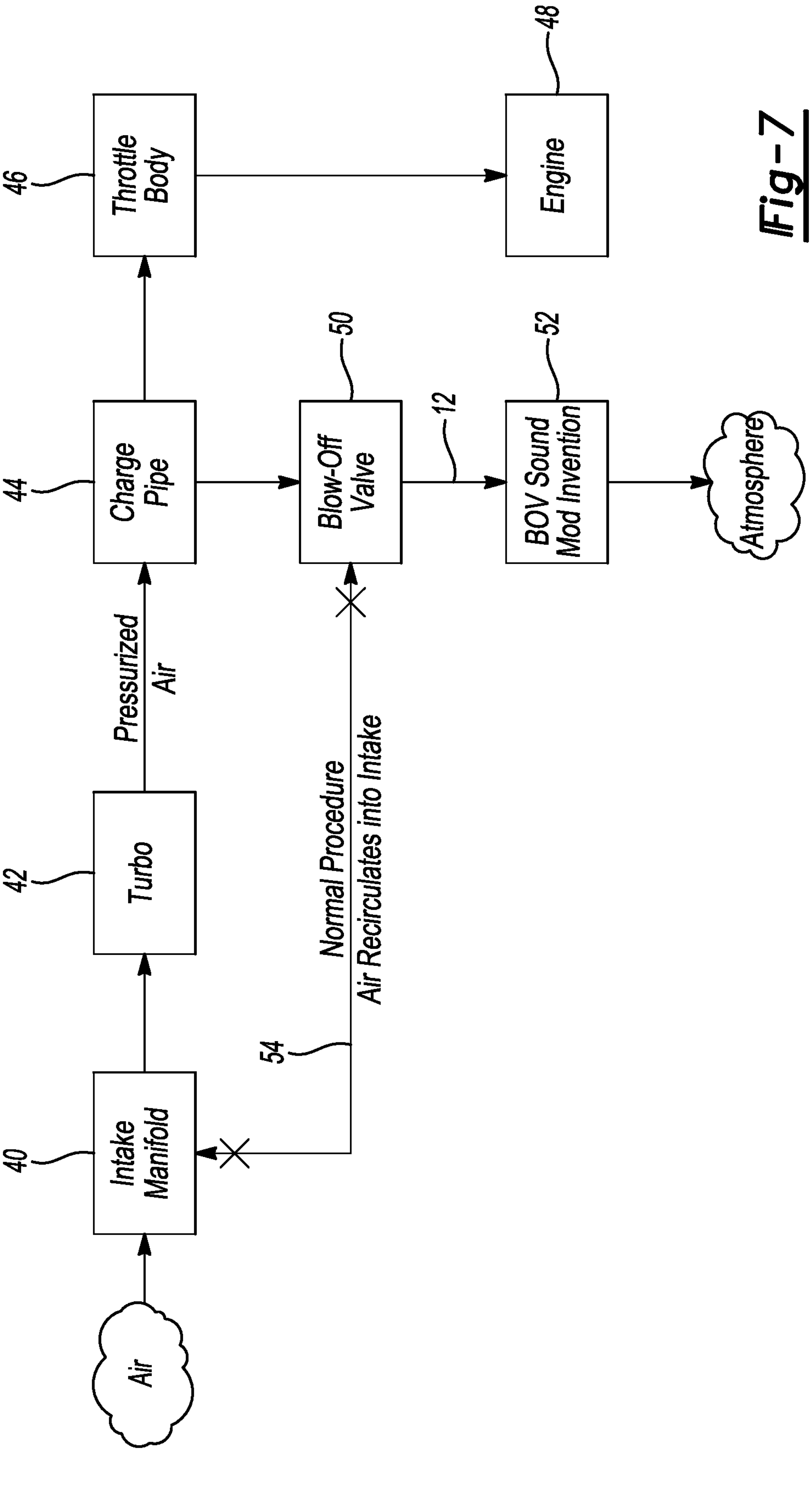
FIG. 7 is a flow chart illustrating how the turbocharger system of a vehicle is modified to attach the sound modification apparatus.

Referring to FIGS. 2 and 3, the sound modification apparatus 10 is shown to include a hose attachment portion 16 adapted to be connected to the short section of hose 12 that receives vented gases from the blow-off valve of a vehicle as shown diagrammatically in FIG. 7. The sound modification apparatus 10 includes a central horn 18 having a bell-shaped end through which a first tone is emitted when the vented gases pass through the central horn. The sound modification apparatus 10 also includes plurality of arcuate openings 20 arrayed around the central horn 18. The arcuate openings 20 defined by the hose attachment portion emit a portion of the vented gases that are directed toward an outer surface 22 of the central horn 20, wherein a second tone is emitted that differs from the first tone when the vented gases pass outside the central horn.

The arcuate openings 20 are formed at the juncture of the hose attachment portion 16 and the central horn 18 that is also referred to herein as a conical end. The arcuate openings 20 are separated by a plurality of ribs 24. In the illustrated embodiment, four arcuate openings 20 and four ribs 24 are provided that are equally spaced around the central horn 18.

An annular lip 26 is provided ant the opposite end of the hose attachment portion 16 from the central horn 18 that facilitates the retention of the sound modification apparatus 10 on the recirculation hose 12. The annular lip 26 includes a ramp surface 28 and a radial surface 30. The ramp surface 28 and the radial surface 30 are joined at a protruding edge 32. When the short section of hose 12 is assembled to the sound modification apparatus 10, the ramp surface expands the short section of hose 12 slightly to facilitate insertion. After the short section of hose 12 is fully assembled over the hose attachment portion 16, hose clamps resist removal of the short section of hose 12 from the hose attachment portion 16.

Figure 4:
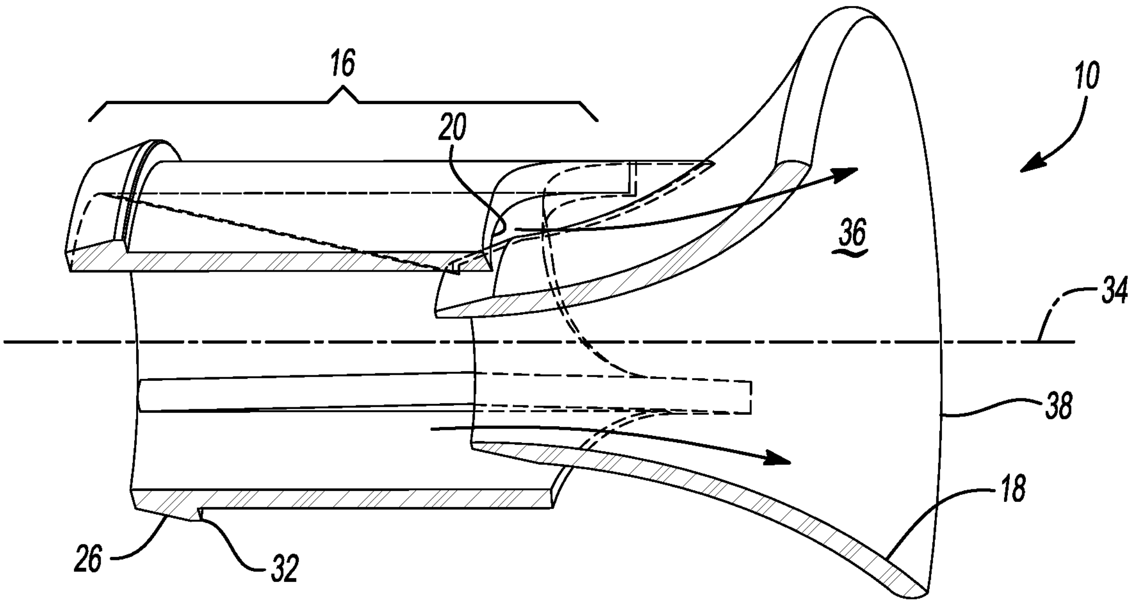
FIG. 4 is a cross-section view taken along the line 4-4 in FIG. 3.

Referring to FIG. 4, the structure of the sound modification apparatus 10 is shown in greater detail in a cross-section through a central axis 34. The central horn 18 at the central axis 34 is shown to be generally bell-shaped with an inner surface 36 that flares outwardly in an arcuate path from the hose attachment portion 16 to a distal end 38. A first portion of the vented gases flows through the central horn 18 and a second portion of the vented gases flow through the arcuate openings 20 as indicated by an arrow in FIG. 4. The hose attachment portion 16 includes the annular lip 26 that includes the protruding edge 32. The hose attachment portion 16 includes the ribs 24 on the inside thereof.

Figure 5:
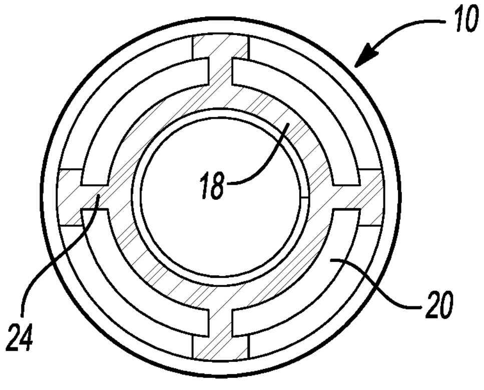
FIG. 5 is a cross-section view taken along the line 5-5 in FIG. 3.

Referring to FIG. 5, the structure of the sound modification apparatus 10 is shown in cross-section through the central horn 18, the arcuate openings 20, and the ribs 24. The vented gases emitted from the short section of hose 12 are split into two portions with a first portion flowing through the central horn 18 and a second portion flowing through the plurality of arcuate openings 20. The first portion creates a first tone and the second portion creates a second tone.

The dynamic pressure developed by the sound modification apparatus 10 changes the sound of the apparatus by creating high pressure areas where the flow splits and is diverted around the central horn 18. The high pressure areas amplify the sound of the air passing through the central horn 18. As a result, the air diverted around the outer surface 22 has a different tone.

Figure 6:
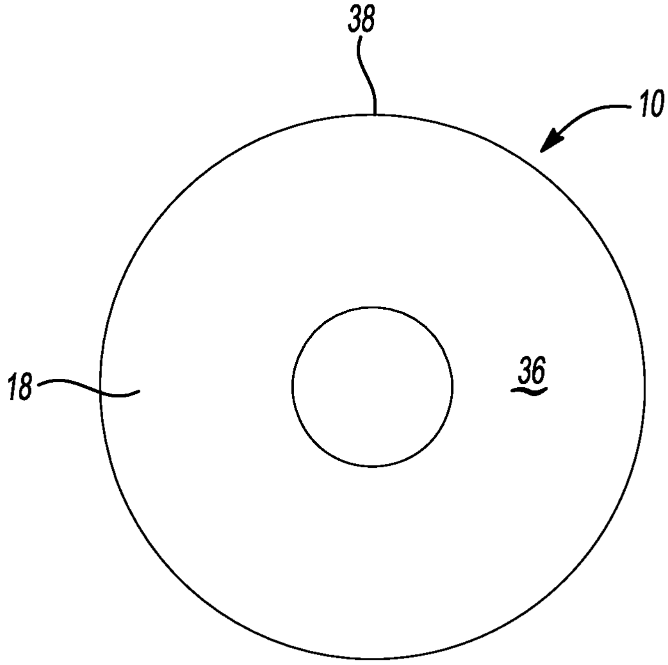
FIG. 6 is a front elevation view of the sound modification apparatus

Referring to FIG. 6, the sound modification apparatus 10 is shown from the front of the central horn 18 and shows the inner surface 36 and the distal end 38.

Referring to FIG. 7, installation and operation of the sound modification apparatus 10 is diagrammatically illustrated.

In the factory designed operation of the turbocharger system, air flows into the system and through the intake manifold at 40. Air flows from the intake manifold to the turbocharger at 42 that pressurizes the air as it is delivered to the charge pipe at 44. The pressurized air then flows into the throttle body at 46 and then to the engine at 48. When a driver lifts off the accelerator to decelerate, the pressurized air is diverted to a blow-off valve at 50 that recirculates the pressurized air to the intake manifold at 40 through the recirculation hose 54.

In the method of operation of the turbocharger system with the sound modification apparatus 10 installed, the recirculation hose 54 is disconnected from the intake manifold and the sound modification apparatus 10 attached to the short section of hose 12. The port of the intake manifold that the exhaust gas recirculation was previously supplied to is plugged with a cap. Air flows into the system through the intake manifold at 40. Air flows from the intake manifold to the turbocharger at 42 that pressurizes the air as it is delivered to the charge pipe at 44. The blow-off valve at 50 diverts the air into the short section of hose 12. The short hose 12 is connected to the sound modification apparatus 10 and air is vented to the atmosphere, at 52. As previously described, the air flowing through the sound modification apparatus 10 creates a dual tone sound that is preferred by high performance vehicle enthusiasts.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A sound modification apparatus for a turbocharged engine comprising:

a hose attachment portion adapted to be connected to a hose that receives vented gases from a blow-off valve of the turbocharged engine;

a central horn having a bell-shaped end through which a first tone is emitted when the vented gases pass inside the central horn; and a plurality of arcuate openings defined by the hose attachment portion through which the vented gases pass between a plurality of spaced fixed ribs that that extend longitudinally and support the central horn within the hose attachment portion and are connected to an outer surface of the central horn, wherein the vented gases are directed toward the outer surface of the central horn, and wherein a second tone that differs from the first tone is emitted when the vented gases pass through the arcuate openings.

2. The sound modification apparatus of claim 1 wherein the central horn has a central axis, and the bell-shaped end has an inner surface that flares outwardly in an arcuate path from the hose attachment portion to a distal end.

3. The sound modification apparatus of claim 1 wherein the plurality of arcuate openings includes four arcuate openings spaced about the central horn.

4. The sound modification apparatus of claim 1 wherein the hose attachment portion is a cylindrical tube and includes four ribs on an inner surface of the tube that extend longitudinally through the tube.

5. The sound modification apparatus of claim 4 wherein the four ribs extend beyond the hose attachment portion to the outer surface of the central horn.

6. The sound modification apparatus of claim 5 wherein the four ribs are each disposed between two of the arcuate openings.

7. A system for enhancing a sound of an engine having a turbocharger comprising:

a hose receiving vented gases flowing from a charge pipe to a blow-off valve;

a sound modification apparatus connected to an outlet end of the hose, wherein the sound modification apparatus includes a hose attachment portion adapted to be connected to the hose that receives vented gases, and wherein the sound modification apparatus includes a horn having a conical end through which a first tone is emitted when vented gases pass inside the horn; and a plurality of arcuate openings defined by the hose attachment portion through which vented gases pass between a plurality of spaced ribs that that connect the attachment portion to an outer surface of the central horn, wherein the vented gases are directed toward the outer surface of the horn, wherein a second tone is emitted when the vented gases flow around the horn.

8. The system for enhancing a sound of an engine having a turbocharger of claim 7 wherein the plurality of arcuate openings includes four arcuate openings spaced about the horn.

9. The system for enhancing a sound of an engine having a turbocharger of claim 8 wherein the hose attachment portion is a cylindrical tube and includes four ribs on an inner surface of the tube that extend longitudinally through the tube.

10. The system for enhancing a sound of an engine having a turbocharger of claim 9 wherein the four ribs extend from the hose attachment portion to the outer surface of the horn.

11. The system for enhancing a sound of an engine having a turbocharger of claim 10 wherein the four ribs are each disposed between two of the arcuate openings.

12. The system for enhancing a sound of an engine having a turbocharger of claim 11 wherein the four ribs connect the hose attachment portion to the horn.

13. The system for enhancing a sound of an engine having a turbocharger of claim 7 wherein the horn has a central axis, and the conical end has an inner surface that flares outwardly in an arcuate path from the hose attachment portion to a distal end.

14. A method of enhancing a sound of an engine having a turbocharger and a blow-off valve that receives vented gases from the turbocharger, the method comprising:

disconnecting an end of a recirculation hose from an air intake port and the blow-off valve;

plugging the air intake port with a cap; and attaching one end of a hose to a sound modification apparatus, the sound modification apparatus includes a hose attachment portion adapted to be connected to the short hose that receives vented gases, a horn having a conical end through which a first tone is emitted when a first portion of the vented gases pass inside the horn, and a plurality of arcuate openings defined by the hose attachment portion and a plurality of stationary ribs that connect the hose attachment portion to an outer surface of the horn, wherein a second portion of the vented gases pass through the plurality of arcuate openings and are directed toward anthe outer surface of the horn, wherein a second tone is emitted when the vented gases pass outside the horn.

15. The method of enhancing a sound of claim 14 wherein the hose attachment portion is a cylindrical tube and includes four ribs on an inner surface of the tube that extend longitudinally through the tube, and wherein the four ribs extend beyond the hose attachment portion to the outer surface of the horn.

16. The method of enhancing a sound of claim 15 wherein the four ribs are each disposed between two of the arcuate openings.

17. The method of enhancing a sound of claim 16 wherein the four ribs connect the hose attachment portion to the horn.

18. The method of enhancing a sound of claim 14 wherein the horn has a central axis, and the conical end has an inner surface that flares outwardly in an arcuate path from the hose attachment portion to a distal end.

* * * * *